Figure 1:
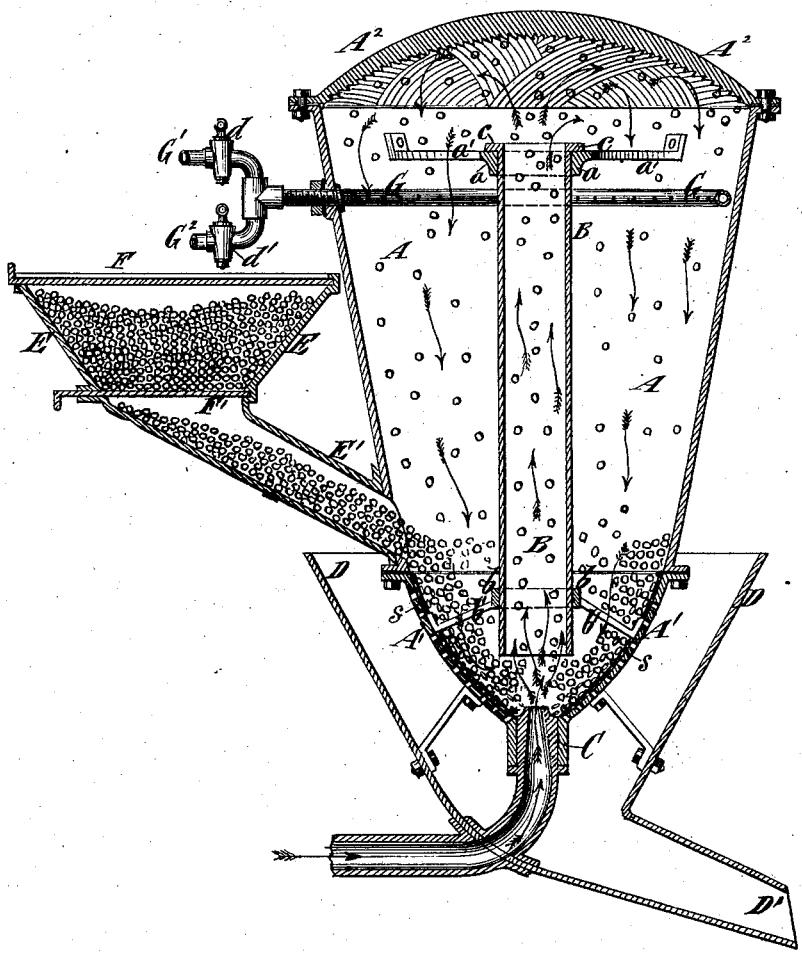

(No Model.)  2 Sheets—Sheet 1.
G. O. GOESSLING.
APPARATUS FOR DISINTEGRATING VEGETABLE SUBSTANCES.
No. 258,912.  Patented June 6, 1882.

(No Model.) 2 Sheets—Sheet 2.
G. O. GOESSLING.
APPARATUS FOR DISINTEGRATING VEGETABLE SUBSTANCES.
No. 258,912. Patented June 6, 1882.
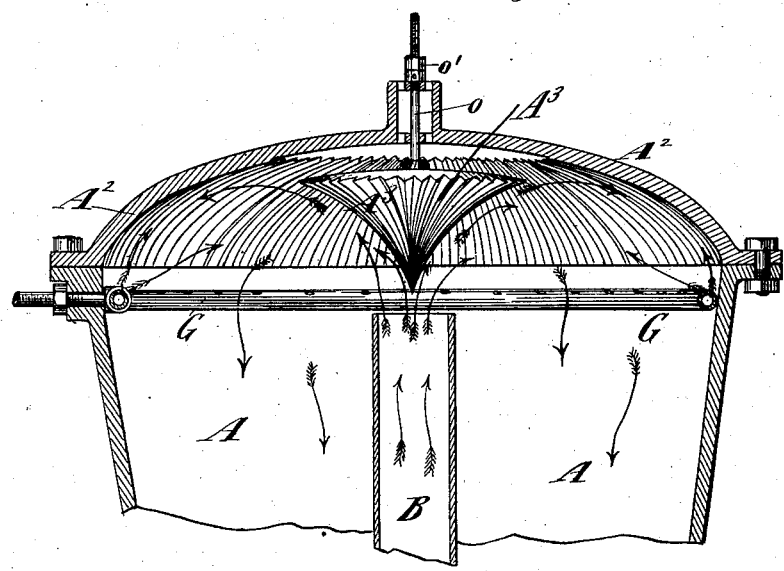

UNITED STATES PATENT OFFICE.

GUSTAVUS O. GOESSLING, OF JERSEY CITY, NEW JERSEY.

APPARATUS FOR DISINTEGRATING VEGETABLE SUBSTANCES.

SPECIFICATION forming part of Letters Patent No. 258,912, dated June 6, 1882.

Application filed December 29, 1880. (No model.)

*To all whom it may concern:*

Be it known that I, GUSTAVUS O. GOESSLING, of Jersey City, in the county of Hudson and State of New Jersey, have invented certain new and useful Improvements in Apparatus for Disintegrating Vegetable Substances, of which the following is a specification.

Although my invention is applicable for the purpose of disintegrating vegetable substances in general, it is especially intended for disintegrating or mashing grain for the manufacture of starch.

The invention consists in the combination, with a closed vessel or chamber having a perforated bottom or lower portion, of a pipe or trunk supported therein and open at both ends, and a nozzle through which air or steam may be injected to produce an upward current through said pipe or trunk, whereby grain or other material is caused to be repeatedly carried up through said pipe or trunk, and to strike with great force against the top or head of said vessel or chamber, and to fall to the bottom thereof outside of said pipe or trunk. The grain or other material is broken up and disintegrated by striking the top of the chamber, and when reduced to a sufficient degree of fineness is forced by the pressure within the chamber through the perforated bottom or lower portion of said vessel or chamber. The head or a portion thereof may be made separate from the top of the vessel or chamber, and so secured that it may be adjusted nearer to or farther from the end of said pipe or trunk, or removed from the vessel or chamber. I also preferably combine with the said closed vessel or chamber a pipe through which water may be admitted to mingle with the starchy or farinaceous particles and carry the same through the perforated bottom or lower portion of the vessel or chamber. I also preferably combine with said vessel or chamber a hopper communicating with the same between its top or head and its perforated bottom or lower portion, whereby I provide for a continuous feed of material to the said vessel or chamber and render its operation continuous.

The invention also consists in details of construction to be hereinafter described.

In the accompanying drawings, Figure 1 represents a central vertical section of an apparatus embodying my invention; and Fig. 2 represents a section of the top portion of an apparatus of slightly modified form, also embodying my invention.

Similar letters of reference designate corresponding parts in both figures.

A designates a closed vessel or chamber, which is here represented as circular and tapering toward the bottom, and having its lower portion or bottom A' perforated, as clearly shown. In addition to the perforations the inside of said bottom or lower portion may be covered with wire-gauze or bolting-cloth S of any desired degree of fineness. The inner surface of the head or top, $A^2$, of the vessel or chamber A is designed to serve as a disintegrating-surface, against which substances are to be impelled to disintegrate or mash them, and in order that said head or top may better subserve such purpose its inner surface is grooved or serrated, so as to form teeth, as clearly shown. The inner surface of the head $A^2$ may be of millstone, chilled metal, or other material.

B designates a pipe or trunk arranged within the chamber or vessel A and supported by means of two rings or sockets, $a\ b$, which are attached by means of arms $a'$ and $b'$ to the interior of the vessel or chamber, the upper end of said pipe or trunk being provided with a flange, $c$, which rests upon the upper ring or socket, $a$, as clearly shown. The pipe or trunk B is open at both ends, and has a free communication at each end with the vessel or chamber A, in which it is situated.

C designates a nozzle arranged below the open lower end of the pipe or trunk B, and through which steam or air may be injected to produce an upward current of the substance— such as corn—which is contained within the vessel or chamber through the pipe or trunk B and against the inner surface of the head $A^2$ of the vessel or chamber A, by which said substance is reduced or mashed. The substance, after striking the head $A^2$, is carried outward by the currents of air and falls down outside the said pipe or trunk. The injection of air or steam from the nozzle C being either continuous or in pulsations, the substance being disintegrated receives a rotary motion—that is, it passes up through the pipe or trunk B, then down the outside thereof, and again up said pipe or trunk until it is brought to such a degree of fineness that the pressure within the vessel or chamber will force it out through the perforated bottom or lower portion, A', of the vessel or chamber A. The fine material so passing through the perforated bottom or lower portion, A', is delivered into a hopper, D, from which it passes through a chute or spout, D', to any suitable receptacles.

In order to provide for a continuous feed of grain or other substance to the vessel or chamber A, I employ a hopper, E, connected by a spout or chute, E', with the vessel or chamber A between its top or head and perforated bottom or lower portion. Upon this hopper being filled the grain or other substance will pass down the spout or chute E' as fast as the mouth thereof is uncovered by the quantity of grain or other substance in the vessel or chamber A becoming reduced through the discharge of fine substance through the perforated bottom or lower portion, A', of the vessel or chamber A. By this means the level of the substance in the vessel or chamber A will be maintained at the top of the outlet of the spout or chute E', where it joins the vessel or chamber A.

If desirable, water may be introduced through the hopper E with the grain or other substance to preclude the latter from clogging in the spout E'.

In order to prevent the pressure within the vessel or chamber A from blowing the grain or other substance backward out of the hopper E and spout or chute E', I provide the said hopper with two gates, F F', only one of which is to be open at a time. When the hopper is to be filled with grain or other substance to be disintegrated or mashed the gate F' is closed and the gate F opened, after which the gate F is closed and the gate F' opened to deliver the material to the spout or chute E'.

In disintegrating and mashing some substances it may be found desirable to inject steam through the nozzle C; but for the disintegration of corn for the production of starch I prefer to employ a blast of cold air at a pressure which may be found most desirable.

To aid in delivering the disintegrated corn through the perforated bottom or lower portion, A', of the vessel or chamber A, I employ a pipe, G, extending around the said vessel or chamber, and perforated so as to deliver water therein. The water so introduced may be cold or it may be heated, care being taken, however, that it is not heated to a temperature which is sufficient to coagulate the starchy matter.

To provide for introducing water of the desired temperature I provide the pipe G with two inlets, G' G², one for hot and one for cold water, the inflow of water from said inlets being regulated by cocks or valves $d\ d'$.

The corn, before being placed in the hopper E, is soaked, so as to soften it, and when the hulls and foreign matters accumulate in the vessel or chamber A they may be removed through hand-holes, which may be provided for such purpose. The bottom A' may, however, be removable for the purpose of cleaning.

It will be understood that the great advantage in my apparatus consists in the fact that its operation is continuous so long as there is corn in the hopper and a blast of air or steam entering through the nozzle C.

Instead of the vessel A being constructed so that the material carried up through the pipe or trunk B will strike directly against the top $A^2$ of said vessel, the said vessel may be fitted with a head, made separate from the top $A^2$ and bolted or otherwise secured thereto, for the material to strike against, and this head may have its face corrugated or otherwise suitably constructed to facilitate the disintegration of the material. The face of said head may be convex, flat, or concave.

In Fig. 2 I have represented a conical head, $A^3$, which is suspended by a bolt, $o$, from the cover $A^2$, and may be raised and lowered relatively to the end of the pipe or trunk B by means of nuts $o'$ upon said bolt $o$. The head $A^3$ is corrugated or roughened upon the surface, so as to partially reduce material impelled against it, and it deflects the material and directs it upon the head $A^2$, where its disintegration is completed.

The vessel A should be fitted with a safety-valve to relieve any excessive pressure that may accumulate therein by reason of the stoppage of the perforations in the bottom.

If desirable, water may be introduced instead of steam or air by the pipe at the bottom of the vessel A. In such case a rose may be applied to the nozzle C.

To introduce the air, steam, or water through the nozzle C in pulsations the pipe through which said nozzle is supplied should be provided with means of opening and closing it at regular intervals. Such means are not, however, embraced in this invention, but may form the subject-matter of a separate application for patent.

What I claim as my invention, and desire to secure by Letters Patent, is—

1. The combination, with a closed vessel or chamber having a perforated bottom or lower portion, of a pipe or trunk supported therein and open at both ends, and a nozzle through which air or steam or water may be injected to produce an upward current of the material to be disintegrated through said pipe or trunk and against the top or head of said vessel or chamber, whereby I provide for a continuous delivery of the disintegrated material through the perforated bottom or lower portion of said vessel or chamber, substantially as specified.

2. The combination, with the closed vessel or chamber, of a pipe or trunk supported therein and open at both ends, the nozzle through which air, steam, or water may be injected to produce an upward current of the material to be disintegrated through said pipe or trunk, and a removable and adjustable head against which the material is impelled by said air, steam, or water, substantially as specified.

3. The combination, with a closed vessel or chamber having a perforated bottom or lower portion, of a pipe or trunk supported therein and open at both ends, a nozzle through which air or steam or water may be injected to produce an upward current of the material to be disintegrated through said pipe or trunk and against the top or head of said vessel or chamber, and a pipe for supplying water to the contents of said vessel or chamber, substantially as and for the purpose specified.

4. The combination, with a closed vessel or chamber having a perforated bottom or lower portion, a pipe or trunk supported in said vessel or chamber and open at both ends, and a nozzle through which steam or air or water may be injected to produce an upward current of the material to be disintegrated through said pipe or trunk and against the top or head of said vessel or chamber, of a hopper communicating with said vessel or chamber between its top or head and its perforated bottom or lower portion, substantially as and for the purpose specified.

5. The combination of the closed vessel or chamber A, having a perforated bottom or lower portion, A', and head A², the hopper E, provided with gates F F', the spout E', the pipe or trunk B, and the air, water, or steam nozzle C, all substantially as specified.

GUSTAVUS O. GOESSLING.

Witnesses:
HENRY T. BROWN,
FREDK. HAYNES.